Sept. 24, 1946.    W. F. STANTON    2,408,348
FUEL MIXTURE CONTROL
Filed June 12, 1937    3 Sheets-Sheet 2
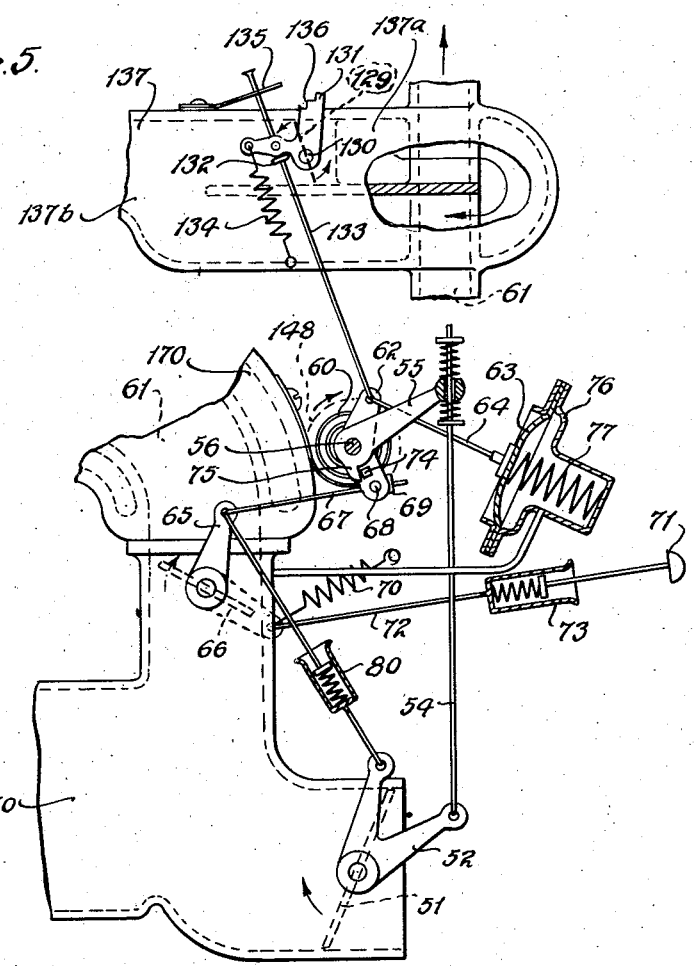
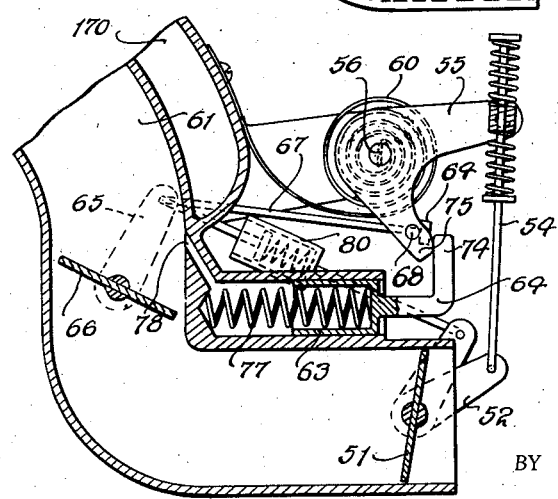
INVENTOR.
WARREN F. STANTON.
BY
ATTORNEY.

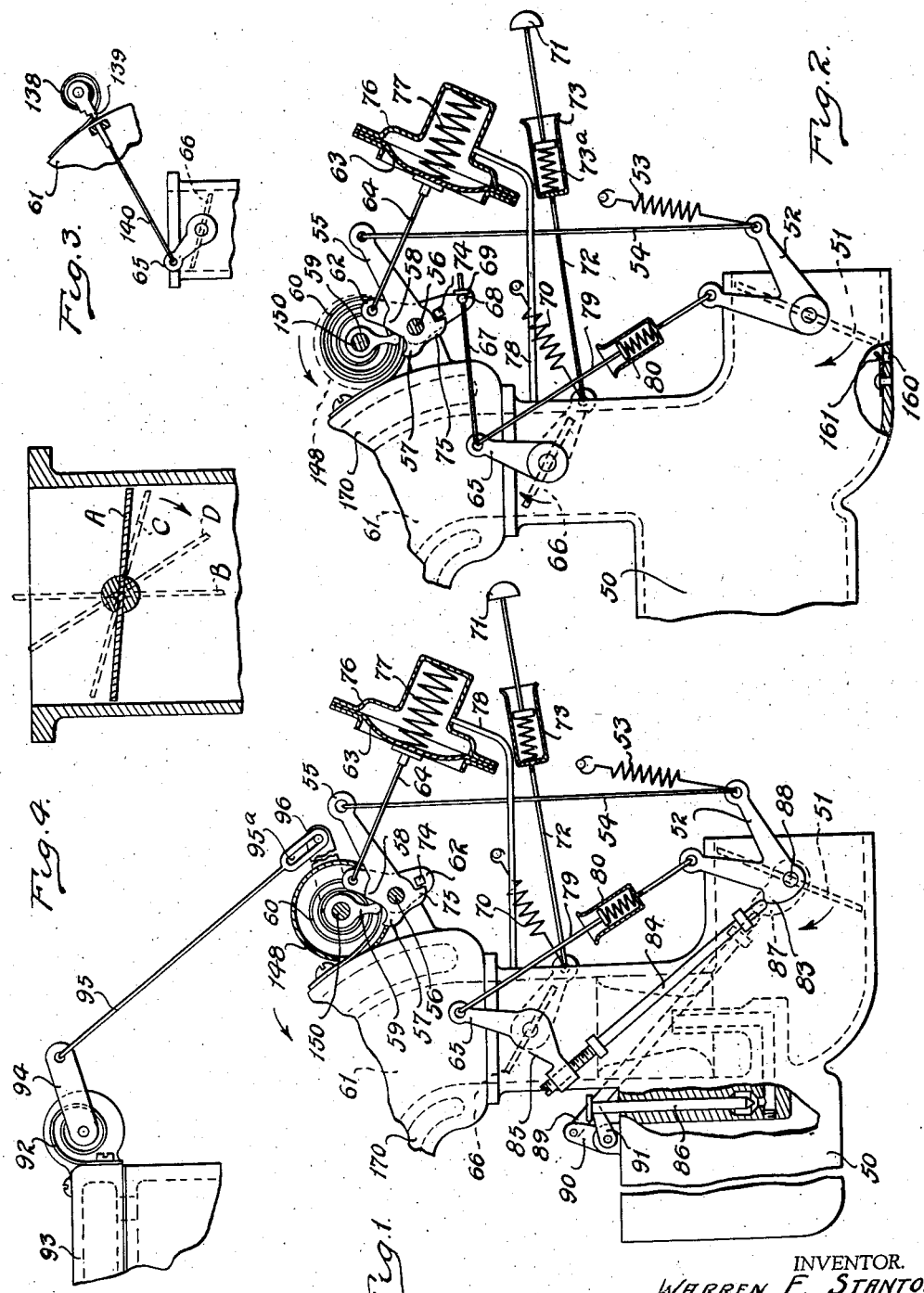

Patented Sept. 24, 1946

2,408,348

UNITED STATES PATENT OFFICE 2,408,348

FUEL MIXTURE CONTROL

Warren F. Stanton, Pawtucket, R. I., assignor, by mesne assignments, to American Car and Foundry Investment Corporation, New York, N. Y., a corporation of Delaware Application June 12, 1937, Serial No. 147,876

13 Claims. (Cl. 123—119)

This application is a continuation in part of my copending application, Serial No. 600,038, filed March 19, 1932, in which it is pointed out that, taking the case of an explosion or internal combustion engine to exemplify the invention, the nature of the fuel mixture, gasoline and air, that is, the proportion of gas and air, should vary under the varying operating conditions of the engine, a rich mixture being required under certain conditions and a lean or leaner under other operating conditions. The mixture, of course, should be just that which is most suitable to the engine conditions at the time, for the most efficient and otherwise satisfactory use of fuel. There are, broadly, three operating conditions to which the mixture should be adapted, as to richness or leanness. They are (1) starting of a dead engine, (2) idling, and (3) running. And a factor to be reckoned with in each of these conditions is the engine temperature.

The important object of my invention is to assure that fuel mixture which is best fitted for the requirements of each operating condition and varying the mixture from time to time in correspondence with the varied requirements, and another object is to accomplish this by means that causes the mixture variation automatically by causing movement of the actuating parts from the mixture using instrumentality itself, that is to say, the engine itself, if it is an internal combustion engine that is dealt with.

I will describe or explain my invention in relation to an internal combustion engine having a conventional carburetor.

The nature of the fuel mixture with a conventional carburetor is controlled by a choke valve, or means for cutting off the air supply to the carburetor. Cutting off air supply results in enriching the mixture and increasing air leans the mixture. And the amount of throttle opening affects the mixture by varying the turbulence of the flowing mixture and thereby affecting the admixture of the air and gasoline components.

I find it impossible to obtain satisfactory control by temperature alone, since with a cool start the thermostat has little or no action for a considerable period of time, and since the degree of wetness of the inlet manifold at a given instant, with its effect on the running of the engine at that time, determines the amount of fuel required, and temperature does not follow this wetness condition. As the firing conditions of the engine depend upon this degree of wetness, and as the firing conditions affect the engine cylinder pressure, exhaust manifold pressure, and inlet manifold pressure; so that those pressures vary instantaneously with the condition of the mixture, I use these various pressures, either singly or in combination, as a primary means of controlling the mixture through choke and throttle valve, and use the mixture temperature or/and the water jacket temperature as a modifying or limiting means, as by use of a thermostat or temperature responsive device.

Another important feature of my invention is the production of positive unchoke by throttle action. Flooring the accelerator pedal to open the throttle fully, completely unchokes the engine, as does closing the throttle, so that the car drives the engine with its accompanying very high vacuum.

Another important feature of my invention is the use of a thermostat that is yielding for the first portion of its range of action and unyielding for the latter portion. This permits pressure and throttle control of the choke through most of the thermostat temperature range, and finally a lockout of the choke by the thermostat at high temperature.

I also provide for the thermostat to continue its expansion freely when hot, thus preventing such damage to it as would happen if its expanding movement should be positively stopped.

With my invention for mixture control, the primary consideration is the firing conditions of the engine itself supplemented or modified by engine heat conditions, and by manual operation of the throttle.

*Starting.*—The mixture going through the intake manifold, when the engine is cranked, is infinitely lean. In order that the engine may start firing, a rich mixture should be instantly supplied and the throttle should be partially opened to produce sufficient fuel supply to the starting up engine. To assure a rich mixture, the carburetor must be choked, that is, its air supply must be cut off, or diminished. The degree of choking, or diminution of air supply will depend on the engine temperature. A cold engine requires a rich mixture and a warm or hot engine, a leaner mixture, taking account of the vaporizing effect on gasoline of its contact with the heated surfaces of the engine. Features of my invention are means for closing the choke valve during starting and regulating the degree of closure according to engine conditions, and to hold the throttle partially open to assure sufficient fuel supply.

*Idling cold.*—Immediately the engine starts firing it should be supplied with a leaner mixture than that used in starting, as the mixture required for starting is too rich. Since the engine is cold, that is, since the temperature is not high enough to operate instrumentalities to lean the mixture, the intake manifold vacuum is effective and can be utilized to unchoke by opening the air valve. A feature of my invention is the use of such vacuum for this purpose. This is possible because immediately the engine starts firing, the intake vacuum increases to a degree that I can use it. The engine speed will vary as the fuel mixture varies from opening and closing the choke, and it results that by controlling the choke by the vacuum, I assure a proper mixture to maintain idling speed of the engine.

Maintenance of idling speed is also dependent on proper throttle opening, and the degree of opening should vary with the engine temperature. With a cold engine, the throttle opening should be greater than with a warm engine. It is a feature of my invention to utilize the vacuum to control the degree of throttle opening and to so control it that more than normal idling speed is maintained with a cold engine, so that when the speed drops, with consequent reduction of vacuum, the throttle opens slightly, or enough to prevent engine stalling and thus maintains a non-stalling condition. I may say at this point that another feature of my invention concerns the automatic maintenance of a non-stalling condition during idling as pointed out more fully hereinafter.

*Idling warm and hot.*—During warming up, the mixture should be gradually leaned, and a feature of my invention is to accomplish that and automatically by cutting down the amount of choke, and closing the throttle slightly, the latter being desirable because as the engine warms up, its speed with the same throttle opening will tend to increase. With a warm engine, there is an increase in thermal efficiency and decrease of internal friction that result in speed increase. I utilize the engine temperature, as by thermostatic means to limit the actuation of the air valve and throttle valve.

I find the most efficient temperature control to be one that utilizes the temperature of both the heated mixture and the heated water. The mixture heat rises rapidly as the engine warms up on starting and is, therefore, ideal to control the choke on starting and warming up. Such heat, however, decreases very rapidly when the engine stops. But the water temperature, and therefore the engine temperatures, continues high even after the engine stops. The advantage of using both, as I prefer, is therefore apparent. Control by mixture temperature alone, while efficient at the start, is not efficient when the engine stops, because of rapid loss of mixture temperature. Control by the water, or engine temperature is not efficient at the starting of a cold engine, but is efficient when the engine stops. The use of the two sources of heat or temperature enables the deficiency of one to be compensated by the other. However, sufficient nicety of control for practical purposes, especially for the sake of simplicity of parts, may be had by using one, and preferably the mixture heat. If but one thermostat is used, by allowing the thermostat to overrun after a certain temperature is reached, that with the lapse of time for it to return to operative condition upon cooling, approximates the lag accomplished by the use of two thermostats.

*Running cold.*—A properly proportioned mixture must be maintained for running. Too lean mixture results in back-fire through the carburetor, audibly, or otherwise. This reduces the manifold vacuum, and this is available to partially choke the carburetor to enrich the mixture as hereinbefore explained. With too rich a mixture, the engine "bucks," and the instinctive act of the driver is either to step on the accelerator to give more gas, or to release the accelerator. It is a feature of my invention to utilize each of these actions to unchoke the carburetor and thereby lean the mixture and clear the engine.

With a cold engine, it is desirable the throttle should not be capable of complete opening. This is so because, first, better atomization can be obtained because of increased turbulence and change in vapor pressure of the fuel, and second, because of hurtful effects from running a cold engine at high speed. A feature of my invention is to prevent full throttle opening when the engine is cold.

When, as in coasting, the car drives the engine, it is desirable to have a lean mixture. I assure a properly lean mixture by using the intake manifold vacuum, as that can be advantageously done because that vacuum increases greatly when the car drives the engine, and that vacuum increase unchokes the carburetor and leans the mixture.

*Running warm and hot.*—In running with a warmed, or heated, engine, the mixture should be leaned in correspondence with the engine temperature, and with the engine highly heated there should be no choke, and under this condition it should be possible completely to open the throttle. I do this by causing temperature responsive devices to limit the degree of choke or unchoke as the engine warms up and to set the throttle control so that the throttle may be fully opened.

*Non-stalling.*—Prevention of stalling is important at all times, but especially when the car has a free-wheeling equipment, or unit. Then the car does not drive the engine when coasting and with the engine idling, it may stop. If this happens, it may be very dangerous, as for example, when passing or crossing cars in traffic, and starting of the dead engine is necessary. As by my invention the throttle opening is controlled by the intake manifold pressure, or vacuum, it follows that when the manifold pressure decreases from the slowing down of the stopping engine, the throttle at once opens, and the engine continues to run.

*Other features of my invention.*—I also provide, to control the mixture in conjunction with the intake manifold vacuum, the use of either the engine pressure or the exhaust manifold pressure. And where simpler installation is desirable, I use a hand control in place of automatically acting means which acts in conjunction with the intake manifold pressure. I also may control by-passing hot gases around the intake manifold to heat it.

In connection with the heat responsive devices or thermostats, the amount of heat radiation may be regulated so as to give a quick pick-up from a cold start by minimum of radiation. Overheating is prevented and a retarding effect produced in the action of the thermostat as it grows hot, as in that condition radiation is increased. And too sudden cooling off of the thermostat is prevented by cutting off radiation therefrom.

I do not restrict myself to an embodiment of my invention which will contain all or any number of the features or the devices before mentioned and hereinafter to be described, but my invention is to be understood as consisting in whatever is described by or is included within the terms or scope or legal meaning of the appended claims.

Because it makes for clarity of illustration, the annexed drawings will be found diagrammatic in many respects. In such drawings:

Figure 1 shows in side elevation, with parts in section, an embodiment of my invention as shown applied to a gas engine carburetor, an automatic control being obtained by making use of the intake manifold vacuum and the inlet manifold temperature, and in addition the water temperature modifies the action of the device.

Figure 2 is a similar view of another embodiment of my invention omitting the temperature control dependent on the water jacket temperature.

Figure 3 is a detail view showing a temperature operated device for preventing the full opening of the throttle when the inlet manifold jacket is cold.

Figure 4 shows diagrammatically the combined effect of the control illustrated in Figure 3 and the controls illustrated in Figures 1 and 2 on the limiting positions of the throttle valve, both when the inlet manifold is hot and when the inlet manifold is cold.

Figure 5 is a view similar to Figures 1 and 2, with the addition of means to control the passage of the heated exhaust gases through the inlet manifold.

Figure 6 is a diagrammatic view of the essential features of Figure 5.

Corresponding parts in the various figures are designated by the same reference numerals.

Figure 7:
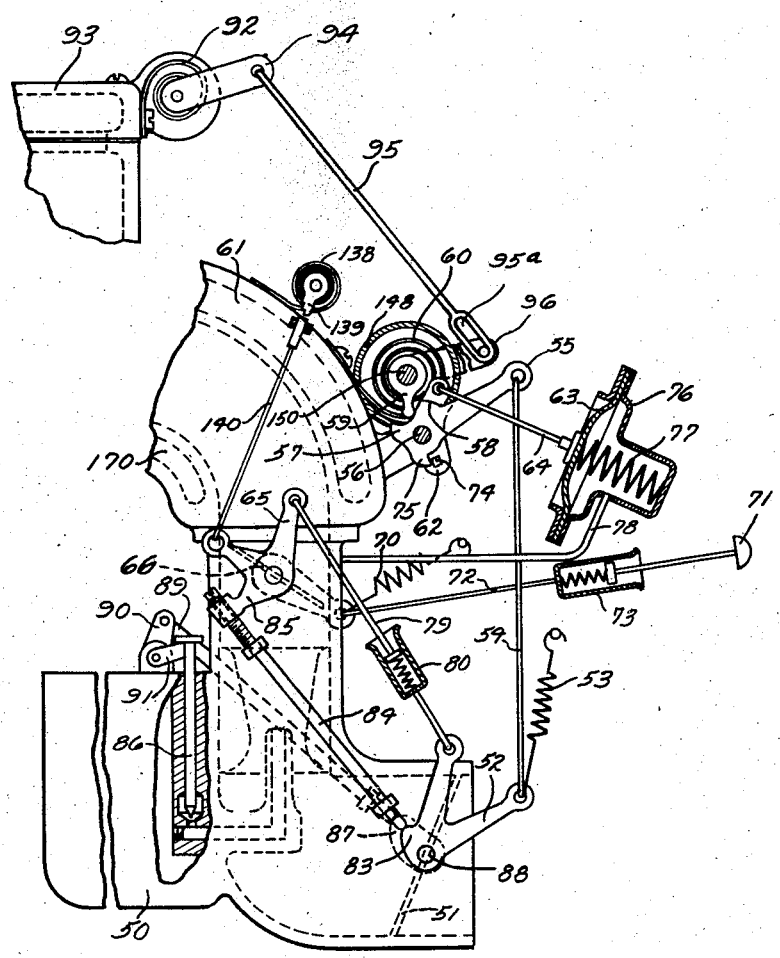
Figure 7 shows the application of the thermostat limiting the throttle opening as shown in Figure 3 to the device shown in Figure 1.

I will now describe the embodiment of my invention by reference to the drawings, referring when necessary to the particular figures.

Carburetor 50 has an air inlet with a choke valve 51, operated by lever 52, movement in the direction of the arrow opening the choke. This valve is normally held closed by spring 53, and is connected by rod 54, with lever 55, pivoted freely on pin 56. Lever 55 has two jaws 57 and 58, with which coacts an arm 59, attached to and rotated by thermostat 60. Thermostat 60 is screwed to intake manifold 61, the position being selected for the best representative condition of mixture temperature. The intake manifold 61 is provided with a heating jacket 170 preferably heated with exhaust gases. Heating of the thermostat causes it to rotate pin 150, attached thereto and to rotate arm 59, in the direction indicated by the arrow. Also pivoted freely on pin 56 is lever 62, to one arm of which is connected diaphragm 63 by rod 64. Another arm of the lever 62 is shown in Figure 2 connected to throttle lever 65 of throttle valve 66, by rod 67, which slides through pin 68, held in arm 62, and has fastened to it a collar 69, so that rod 67 is free to slide through pin 68, in one direction, but not the other. When arm 62 rotates counterclockwise, it operates lever 65 to open the throttle valve, but when it rotates clockwise, it does not operate throttle valve 66.

In Figures 1 and 2 the throttle 66 is normally held closed by spring 70 and is manually opened by pedal 71, operating rod 72, through the slip joint 73. Arm 62 has on it a stop plug 74 with which a finger 75 on lever 55 may coact. Diaphragm 63 is held in a housing 76, and is normally held in the position shown by spring 77. The interior of housing 76 is connected with the intake manifold by tube 78, so that diaphragm 63 is subject to the pressure in the intake manifold. Throttle lever 65 is also connected with choke lever 52 by rod 79 and slip joint 80 (Figs. 1 and 2).

Additional enrichment of the mixture may be caused when choke valve 51 is closed, as shown in Figure 1, by an auxiliary by-pass valve 86 operated by a cam 87 attached to stud 88 on which valve 51 is pivoted. The cam 87 acts on one end of rod 89, movement of which rocks levers 90 and 91 to lift valve 86. There is a second cam 83 mounted on the shaft 88 which engages with the rod 84 which, in its turn, engages with the end of the throttle arm 85, which determines the closing position of the throttle 66. By this means the closing position of the throttle valve is limited by the cam 83. It will be noticed that when the choke valve 51 is closed, the throttle valve 66 is slightly opened.

I may also provide a second thermostat 92 (see Fig. 1) attached to and heat responsive to temperature of the water jacket 93, which by crank 94, rod 95, and lever 96, acts in conjunction with the thermostat 60, upon lever 55, and choke and throttle valve.

It may be necessary to provide means for preventing too great enrichment of the mixture when starting. This (see Fig. 2) I accomplish by providing an auxiliary air inlet port 160 normally closed by spring flap valve 161, but which may be opened by the suction in the intake manifold upon the instant of starting, and thus slightly lean the mixture.

Referring to Figure 5, provision is made to control flow of exhaust gases around the intake manifold by a butterfly valve 129, fastened to stud 130, which valve is operated by lever 131. This valve 129 is normally held closed by stop collar 132 on rod 133, connected with arm 62, and is opened by spring 134, when arm 62 moves in a clockwise direction. It may be prevented from being opened by thermostat 135, coacting with a series of notches 136, on lever 131, thermostat 135 being in position to prevent opening when the heater manifold 137 is cold and being in a clear position, as shown, when manifold 137 is hot. By changing the relation of valve 129 and arm 131, and reversing the action of thermostat 135, I maintain an open manifold heater diaphragm position with an open throttle and vice versa. Similar results may be obtained by eliminating thermostat 135, and connecting rod 133 with lever 55 or arm 131 may be connected to both arm 62 and arm 55.

As shown in Figure 3 a stop may be actuated to prevent opening of throttle 66, when the engine is cold by a thermostat 138, bolted to intake manifold 61. Pivoted arm 139 and rod 140 controlled in their movement by thermostat 138, prevent opening of throttle 66, while the engine is cold, but allow opening of throttle 66 when the engine is warm.

Figure 7 shows the application of the device shown in Figure 3 to the device shown in Figure 1. In the combination thus shown the closing and opening positions of the throttle are both limited when the engine is cold and the throttle is only permitted to open and close to its complete range when the engine is hot. It is understood that the device shown in Figure 3 may be omitted.

Figure 4 shows the throttle in the normal idle position A and the normal wide open position B. The fast idle produced by the cam 83 puts the throttle in the position shown at C. The thermostat 138, just referred to, places the throttle in the partially open position in the position shown at D. Thus Figure 4 shows at A the normal idle position, B the normal wide open and C the fast idle position for a cold engine, and D the partially open position when the engine is cold. By limiting the throttle to the wide open position D a certain minimum vacuum is maintained in the inlet manifold, which facilitates distribution under these conditions.

Describing the operation of the devices shown, and first considering control by the inlet manifold pressure and a single thermostat operated by the mixture temperature, as illustrated in Fig. 2, with the engine stopped and cold, thermostat 60 is completely contracted, and arm 59 is in the position shown, pressure in the intake manifold is atmospheric and spring 77 by rod 64 holds arm 62 in the position shown, so that stop 74 allows spring 53 to move lever 55 to the position illustrated, and thus by rod 54 and lever 52, to close choke valve 51. In this position arm 62 also partially opens throttle 66, beyond the normal idling position by collar 69, rod 67 and lever 65, against the tension of spring 70, which constantly tends to close the throttle, but which is less powerful than spring 77. Thus the engine is completely choked and the throttle partially opened, providing the proper condition for starting.

If the engine while stopped is warm or hot, thermostat 60 will have expanded, thus moving arm 59 in counterclockwise direction, and by jaw 58 preventing lever 55 from assuming full choke position, the vacuum and throttle control of choke being thereby modified by the temperature of the engine while stopped, or not running.

The operator now cranks the engine. Immediately the engine starts firing a vacuum is created in the intake manifold and this vacuum acting on diaphragm 63 moves arm 62 by rod 64, in clockwise direction against pressure of spring 77. This change in the position of stop 74 by finger 75, rotates lever 55 in clockwise direction and thus opens choke 51 against pressure of spring 53. Movement of arm 62 also allows spring 70 to close throttle 66, to near normal position. With the engine cold and arm 59 in the position shown, the extent of choke at idling speed depends wholly on the vacuum. As the engine heats up, and arm 59 thereby rotates counterclockwise, the position of arm 55, and therefore the degree of choke, may be limited by either finger 75 abutting against stop 74, or by jaw 58 abutting against arm 59. Thus the degree of choke is controlled by either vacuum or temperature, or both. When the engine is fully heated arm 59 abutting against jaw 58 holds choke 51 completely open. The face of jaw 58 is of such a shape that when lever 55 has moved clockwise to the full unchoke position, it forms an arc concentric with the center of arm 59, so that further movement of the thermostat as it heats up is allowed, while arm 59 still holds lever 55 positively in a full unchoke position. Thus all the ideal idling conditions are attained.

Assume the engine to be idling cold and the operator desires to run the engine. He controls speed in the usual manner by opening throttle 66 by pedal 71, spring 73a being stronger than spring 70, and rod 67, sliding through pin 68, permitting free opening of the throttle with regard to arm 62. Opening the throttle tends to unchoke valve 51 by rod 79 and spring 80, but as spring 80 is weaker than spring 70, full effect is not attained until spring 80 is fully compressed, further movement of the throttle then tending to unchoke. This tendency to unchoke, however, is resisted by jaw 57 abutting against arm 59, when the engine is cold, or cool. Thus full unchoke is prevented under these conditions, according to the degree of temperature of the engine, and also full throttle opening is prevented under like conditions. When the engine is hot, however, arm 59 has moved so that jaw 57 cannot abut against it, and full unchoke and full throttle opening are permitted.

Should the mixture become too lean, the engine will backfire through the carburetor and increase the pressure against diaphragm 63. This pressure, acting in conjunction with spring 77, will move arm 62 counterclockwise, changing the position of stop 74 and permitting full choke by spring 53. If the mixture becomes too rich and the engine starts to "buck," the operator may unchoke by opening throttle 66 fully, in which case spring 80 will be fully compressed and rod 79 will open choke valve 51, or he may unchoke by closing the throttle completely. This will immediately increase the intake manifold vacuum and by action on diaphragm 63, will rotate arm 62 clockwise and stop 74 abutting fingers 75 will move lever 55 clockwise and thus open choke valve 51.

Stalling is prevented under any conditions. Assume the engine to be idling. Immediately that it starts to slow down to near the stopping speed, vacuum in the intake manifold decreases. This allows spring 77 to overcome diaphragm 63 and move arm 62 counterclockwise and thus, by pin 68 and collar 69 on rod 67 to positively move lever 65 to open throttle 66. Movement of arm 62 counterclockwise also moves stop 74 away from finger 75, and if the engine is cold, or cool, so that arm 59 does not limit movement of lever 55, the engine is also partially choked. Thus stalling is prevented by throttle opening alone when the engine is hot, and by throttle opening and partial choking when engine is cold or cool.

When the car is driving the engine at a greater speed than that provided by the throttle opening, increased vacuum is caused in the intake manifold. This acting on diaphragm 63 moves arm 62 clockwise and by stop 74 abutting against finger 75, positively rotates arm 55 to open the choke and lean the mixture.

As hereinbefore mentioned, the ideal method of temperature control is by both mixture temperature and water temperature. To do this, I provide (see Fig. 1) thermostat 92 mounted on the water jacket 93, and thus responsive to the water temperature. This thermostat has an arm 94, by rod 95, connected with lever 96 attached to thermostat 60. As the action of thermostat 92 is slower, both in heating up and cooling, than that of thermostat 60, rod 95 is provided with slot 95a which allows free movement of thermostat 60 at the start of heating up and of cooling, but which provides the desirable retarding effect of thermostat 92 as the engine either warms or cools.

Describing the action of the manifold by-pass shown in Figure 5, I connect the thermostat 60 directly with the arm 55, so that expansion of the thermostat tends to open the choke and contraction of the thermostat closes it. Diaphragm 63 is connected with arm 62 which rotates freely on the hub of the thermostat 60 and has a stop 74, so that action of the vacuum on diaphragm 63 tends to unchoke the carburetor. The exhaust gases from the engine enter heater manifold 137 through port 137a and exhaust through port 137b, and when valve 129 is closed, by-pass as shown by the arrow around the intake manifold, and when valve 129 is open, go directly out of port 137b. Valve 129, which is fastened to stud 130, tends to open by spring 134 attached to an arm on lever 131, but is held from opening by collar 132 on rod 133 when the engine is stopped, when spring 77 holds arm 62 in the position shown. When held shut in this position, with the manifold heater cold, it is held locked by thermostat 135 abutting against notches 136 in arm 131. By providing a series of such notches, the degree to which it is held locked shut may be controlled by the heat of the manifold. When the engine starts, vacuum acting on diaphragm 63 rotates arm 62 to pull collar 132 away from lever 131, thus allowing the temperature of the manifold 137 to control the opening of valve 129. Thermostat spring 135 allows spring 134 to completely open the valve when the manifold is hot. Thus the degree of heating by exhaust gases is controlled by the exhaust manifold temperature and the intake manifold pressure.

It will be apparent that by my invention, the combined effect of the intake manifold pressure and mixture temperature controlling the action of the choke valve, throttle valve, and heater manifold valve, I not only provide for a proper mixture for all operating conditions but eliminate a number of auxiliary features now necessary (such as mechanism for acceleration duration fuel charge) in present carburetors, manual choke, thermostatically operated manifold heater valve, auxiliary starting devices, etc.

Figure 6 shows diagrammatically the construction shown in Figure 5.

In Figures 1, 2 and 5, when the throttle is opened by pressing on the stop 71, the choke 51 is opened by the connection 80 so that the engine does not become flooded during the starting operation as would be the case if the choke 51 remained closed.

What I claim is:

1. A carburetor for an internal combustion engine comprising an inlet passage, a mixture outlet connected thereto and having a throttle valve therein, and means responsive to the temperature of the internal combustion engine adapted to limit both the opening and closing of the throttle valve when the engine is cold.

2. A carburetor for an internal combustion engine comprising an inlet passage, an exhaust jacket therefor and a mixture outlet connected thereto and having a throttle valve therein, means responsive to the temperature of the exhaust heated inlet passage adapted to limit the closing and opening of the throttle valve when the engine is cold.

3. A carburetor for an internal combustion engine comprising an inlet passage, a mixture outlet connected thereto and having a throttle valve therein, and temperature responsive means adapted to limit both the opening and closing of the throttle valve when the engine is cold.

4. A carburetor for an internal combustion engine comprising an air inlet passage, an exhaust jacket therefor and a mixture outlet connected thereto and having a throttle valve therein, and means responsive to predetermined temperature of the engine adapted to control the operation of the throttle valve to a limited range in opening direction when the engine is cold.

5. In combination with an internal combustion engine having an inlet passage, an exhaust jacket therefor, a mixture intake connected thereto, a carburetor having a mixture outlet connected with said mixture intake, a throttle in said mixture outlet, an engine suction operated throttle control, a conduit leading from said throttle control to the suction in said inlet passage, a choke valve mounted in the air entrance to said carburetor, a thermostat in thermal communication with said engine, means operatively connecting said thermostat to said choke valve to maintain said choke valve in open position when the engine is hot independently of the presence of suction in the inlet passage, and means responsive to the temperature of the exhaust jacket for varying the operation of the throttle valve in both directions when the engine is cold.

6. A carburetor for an internal combustion engine comprising an inlet passage having a choke valve therein, an exhaust jacket therefor and a mixture outlet connected thereto and having a throttle valve therein, and means responsive to the temperature of the exhaust jacket adapted to limit both the opening and closing of the throttle valve when the engine is cold, regardless of the position of the choke.

7. In combination with an internal combustion engine having a fuel inlet passage, a carburetor having a mixture outlet passage connected to said inlet passage for the passage of fuel from said carburetor to said engine, a valve for regulating the fuel movement in the outlet passage, and means responsive to the temperature of the engine adapted to regulate the movement of said valve in both opening and closing directions.

8. In an apparatus for preparing and feeding fuel to an internal combustion engine, the combination of an induction tube having choke and throttle valves, means automatically adjusting the choke in accordance with temperature and engine induced pressures, means for automatically adjusting the throttle valve during automatic control of the choke valve, and means for preventing the throttle movement during starting when the engine is cold.

9. In an internal combustion engine, including an intake manifold, a carburetor having a fuel outlet connected to said intake manifold, said carburetor including a choke and throttle, automatic means operated by engine temperature and pressure for regulating said choke and throttle, and stop means for initially preventing the opening of said throttle when the engine is cold.

10. In a carburetor for an internal combustion engine including an air inlet, a choke valve therein, a mixture outlet, a throttle valve for controlling said outlet, means for moving said choke valve towards open position after a predetermined opening movement of said throttle, means for partially opening said throttle valve upon predetermined movement of said choke valve toward closed position, temperature responsive means for operating said choke valve, and means cooperating with said temperature responsive means and operated by differential pressures in said engine for modifying the choke position.

11. The substance of claim 10 characterized in that an additional thermostat is included in the structure for actuating the choke valve.

12. The substance of claim 10 characterized in that an additional thermostat is provided for facilitating operation of the choke valve after a predetermined temperature condition of the engine is reached.

13. The substance of claim 10 characterized in that the means operated by the pressure differentials for modifying the choke movement includes a lever and a one-way connection.

WARREN F. STANTON.